(12) United States Patent
Son et al.

(10) Patent No.: US 8,745,339 B2
(45) Date of Patent: Jun. 3, 2014

(54) MULTI-CORE SYSTEM AND METHOD FOR PROCESSING DATA IN PARALLEL IN MULTI-CORE SYSTEM

(75) Inventors: Min Young Son, Yongin-si (KR); Shi Hwa Lee, Seoul (KR); Seung Woo Lee, Hwaseong-si (KR); Young Sam Shin, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 87 days.

(21) Appl. No.: 13/305,163

(22) Filed: Nov. 28, 2011

(65) Prior Publication Data

US 2012/0198182 A1 Aug. 2, 2012

(30) Foreign Application Priority Data

Jan. 27, 2011 (KR) ........................ 10-2011-0008411

(51) Int. Cl.
*G06F 12/00* (2006.01)
(52) U.S. Cl.
USPC ............................................ 711/154; 709/201
(58) Field of Classification Search
None
See application file for complete search history.

(56) References Cited

U.S. PATENT DOCUMENTS

| 4,621,359 | A | * | 11/1986 | McMillen | 370/235 |
|---|---|---|---|---|---|
| 6,292,822 | B1 | * | 9/2001 | Hardwick | 718/105 |
| 7,136,981 | B2 | * | 11/2006 | Burch et al. | 711/170 |
| 7,532,750 | B2 | * | 5/2009 | Sasaki et al. | 382/154 |
| 7,805,579 | B2 | | 9/2010 | Brokenshire et al. | |
| 8,286,198 | B2 | * | 10/2012 | Munshi et al. | 719/328 |
| 2007/0255929 | A1 | * | 11/2007 | Kasahara et al. | 712/1 |
| 2009/0049443 | A1 | * | 2/2009 | Powers et al. | 718/100 |
| 2010/0082951 | A1 | | 4/2010 | Bates et al. | |
| 2010/0131955 | A1 | | 5/2010 | Brent et al. | |

FOREIGN PATENT DOCUMENTS

| JP | 2007-334469 | 12/1995 |
|---|---|---|
| JP | 2004-252728 | 9/2004 |
| JP | 2010-205083 | 9/2010 |
| KR | 10-2009-0106613 | 10/2009 |

* cited by examiner

*Primary Examiner* — Charles Rones
*Assistant Examiner* — Tian-Pong Chang
(74) *Attorney, Agent, or Firm* — Staas & Halsey LLP

(57) ABSTRACT

A multi-core system and a method for processing data in parallel in the multi-core system are provided. In the multi-core system, partitioning and allocating of data may be dynamically controlled based on local memory information. Thus, it is possible to increase an availability of a Central Processing Unit (CPU) and a local memory, and is possible to improve a performance of data parallel processing.

12 Claims, 6 Drawing Sheets

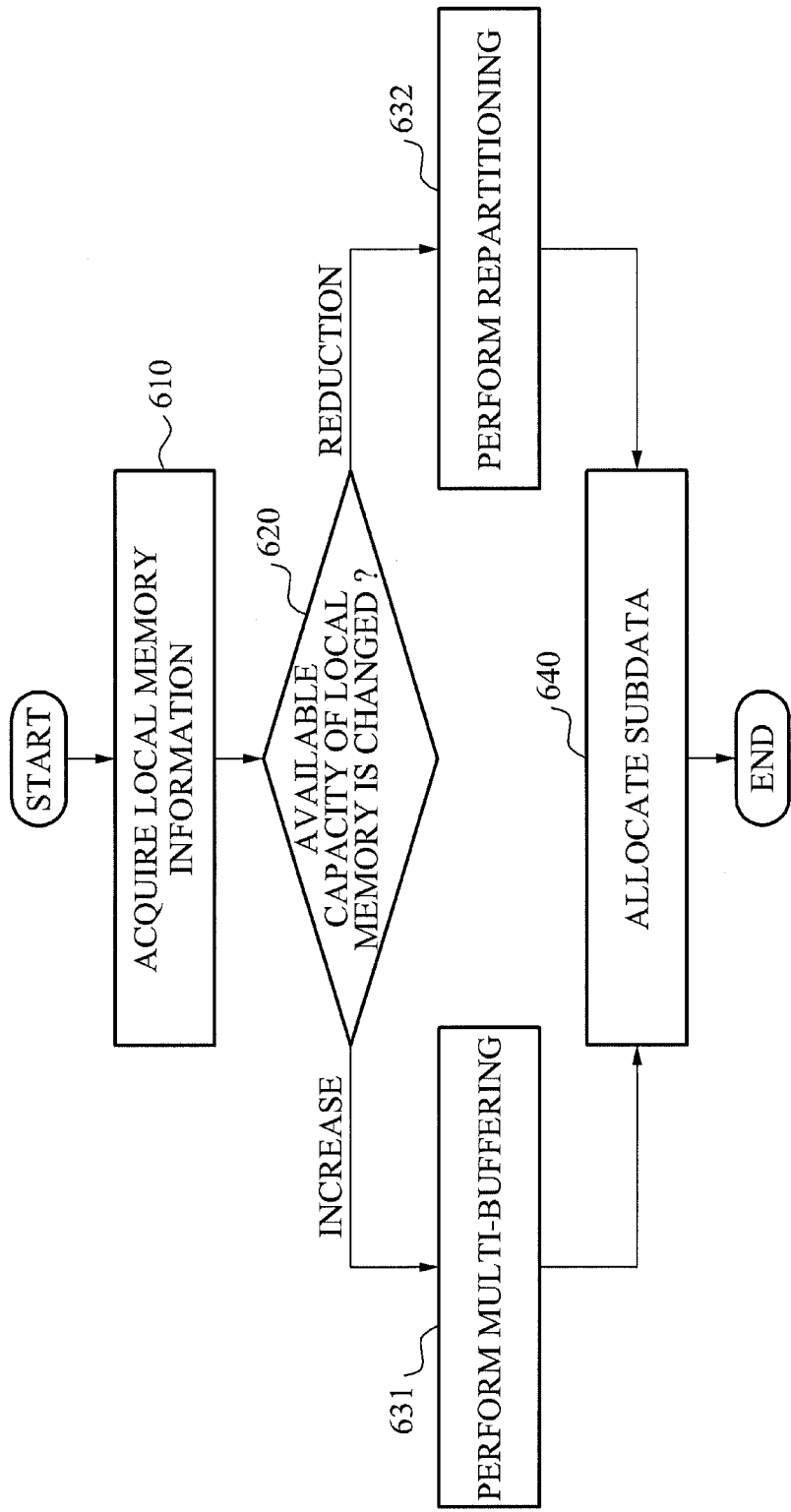

MULTI-CORE SYSTEM AND METHOD FOR PROCESSING DATA IN PARALLEL IN MULTI-CORE SYSTEM

CROSS-REFERENCE TO RELATED APPLICATIONS

This application claims the benefit of Korean Patent Application No. 10-2011-0008411, filed on Jan. 27, 2011, in the Korean Intellectual Property Office, the disclosure of which is incorporated herein by reference.

BACKGROUND

1. Field

One or more example embodiments of the following description relate to a multi-core system, and a method for processing data in parallel in the multi-core system.

2. Description of the Related Art

A conventional single-core system using a single processor has been replaced with a multi-core system using multiple processors, due to limitations in improvements of clock and power problems in the single-core system.

Additionally, such a change due to limitations in hardware inevitably leads to a change in software. Since conventional software is written based on only a single core, it is impossible to expect an improvement in performance when the conventional software is operated in multiple cores. This is because the single-core system is completely different in structure from the multi-core system. Accordingly, to solve the problem, researches have been continuously conducted on an Operating System (OS) for multi-core, a parallel programming model enabling parallel processing, a dynamic execution environment, and the like.

SUMMARY

The foregoing and/or other aspects are achieved by providing a method for processing data in parallel in a multi-core system, including acquiring local memory information regarding a plurality of local memories, the plurality of local memoires respectively corresponding to a plurality of cores, and partitioning the data into a plurality of pieces of subdata, based on the acquired local memory information.

The foregoing and/or other aspects are also achieved by providing a method for processing data in parallel in a multi-core system, including acquiring local memory information regarding a local memory, the local memory corresponding to a core used to process subdata of the data among a plurality of cores, computing a size of a part of the subdata, based on the acquired local memory information, and allocating the part of the subdata to the core used to process the subdata.

The foregoing and/or other aspects are also achieved by providing a method for processing data in parallel in a multi-core system, including acquiring local memory information regarding a local memory during a runtime for processing the data in parallel, the local memory corresponding to a core, and performing multi-buffering on the data when an available capacity of the local memory is increased, and performing repartitioning on the data when the available capacity is reduced.

The foregoing and/or other aspects are achieved by providing a multi-core system for processing data in parallel, including a plurality of local memories, a plurality of cores respectively including the plurality of local memories, a shared memory shared by the plurality of cores, and a controller to control the plurality of cores to process the data in parallel, wherein the controller acquires local memory information regarding the plurality of local memories, and partitions the data into a plurality of pieces of subdata, based on the acquired local memory information.

The foregoing and/or other aspects are also achieved by providing a multi-core system for processing data in parallel, including a plurality of local memories, a plurality of cores respectively including the plurality of local memories, a shared memory shared by the plurality of cores, and a controller to control the plurality of cores to process the data in parallel, wherein the controller acquires local memory information regarding a local memory corresponding to a core used to process subdata of the data among the plurality of cores, computes a size of a part of the subdata based on the acquired local memory information, and allocates the part of the subdata to the core used to process the subdata.

The foregoing and/or other aspects are also achieved by providing a multi-core system for processing data in parallel, including a plurality of local memories, a plurality of cores respectively including the plurality of local memories, a shared memory shared by the plurality of cores, and a controller to control the plurality of cores to process the data in parallel, wherein the controller acquires local memory information regarding the plurality of local memories during a runtime for processing the data in parallel, performs multi-buffering on the data when an available capacity of a local memory among the plurality of local memories is increased, and performs repartitioning on the data when the available capacity is reduced.

The foregoing and/or other aspects are achieved by providing a method for processing data in parallel in a multi-core system comprising a plurality of cores and a plurality of corresponding local memories. The method includes acquiring local memory information regarding the plurality of local memories, and computing a size of subdata to be allocated to a core of the plurality of cores based on the local memory information.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIGS. 4 through 6 illustrate flowcharts of methods for processing data in parallel in a multi-core system according to example embodiments.

DETAILED DESCRIPTION

Figure 1:
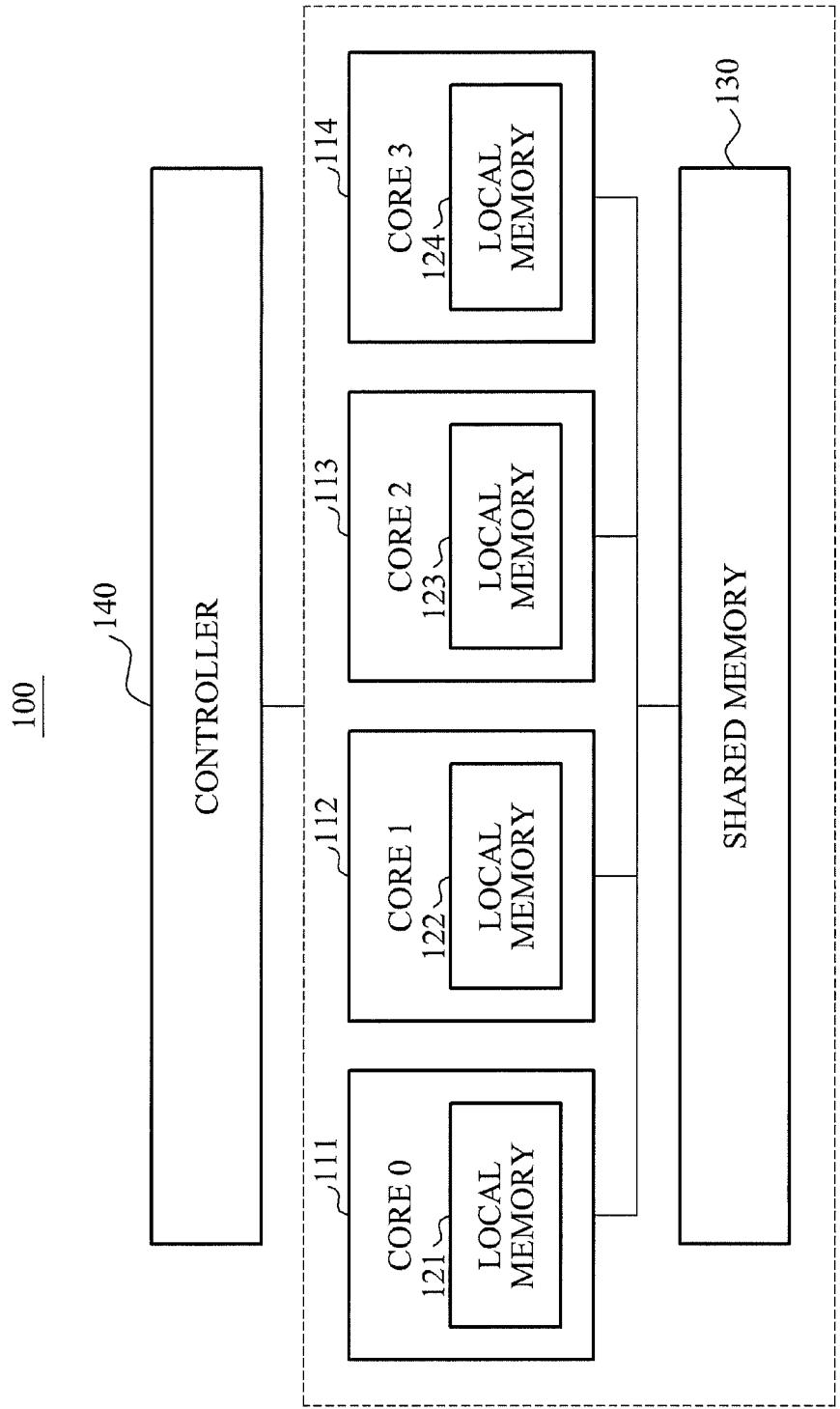
FIG. 1 illustrates a diagram of a multi-core system according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a diagram of a multi-core system 100 according to example embodiments.

Referring to FIG. 1, the multi-core system 100 may include, for example, a plurality of local memories 121, 122, 123, and 124, a plurality of cores 111, 112, 113, and 114, a shared memory 130, and a controller 140. Here, the plurality of cores 111, 112, 113, and 114 may respectively include the plurality of local memories 121, 122, 123, and 124. The shared memory 130 may be shared by the plurality of cores 111, 112, 113, and 114, and the controller 140 may control the plurality of cores 111, 112, 113, and 114 to process data in parallel.

According to an aspect, the controller 140 may acquire local memory information regarding the plurality of local memories 121, 122, 123, and 124.

The local memory information may include, for example, information regarding a total size, a currently used size, an available size, a frequency of use, an access cost, and the like, with respect to each of the plurality of local memories 121, 122, 123, and 124.

The controller 140 may partition data into a plurality of pieces of subdata, based on the acquired local memory information. More specifically, the controller 140 may determine a partition ratio of the plurality of pieces of subdata, based on the local memory information, and may partition the data into the plurality of pieces of subdata based on the determined partition ratio.

According to an aspect, the controller 140 may partition data into a plurality of pieces of subdata based on a ratio of sizes of the plurality of local memories 121, 122, 123, and 124. For example, when the ratio of sizes of the four local memories 121, 122, 123, and 124 is set to "3:1:2:1", the controller 140 may partition data into four pieces of subdata at a size ratio of "3:1:2:1."

Depending on example embodiments, the controller 140 may partition data into a plurality of sets of subdata, based on the local memory information. Here, each of the plurality of sets may include at least one piece of subdata.

According to an aspect, the controller 140 may acquire local memory information regarding a local memory corresponding to a subdata processing core among the plurality of cores 111, 112, 113, and 114. Here, the subdata processing core may be used to process subdata of the data.

Additionally, the controller 140 may compute a size of a part of subdata to be allocated to the subdata processing core, based on the acquired local memory information.

Moreover, the controller 140 may allocate the part of the subdata to the subdata processing core.

For example, when the core 112 processes subdata, the controller 140 may acquire local memory information regarding the local memory 122 corresponding to the core 112. Additionally, the controller 140 may compute a size of a part of subdata to be allocated to the core 112, based on the local memory information regarding the local memory 122. Furthermore, the controller 140 may allocate the part of the subdata to the core 112.

According to an aspect, the controller 140 may acquire local memory information regarding the plurality of local memories 121, 122, 123, and 124, during a runtime for processing data in parallel.

Additionally, when an available capacity of a local memory among the plurality of local memories 121, 122, 123, and 124 is increased, the controller 140 may perform multi-buffering on the data. Conversely, when an available capacity of a local memory among the plurality of local memories 121, 122, 123, and 124 is reduced, the controller 140 may perform repartitioning on the data.

According to an aspect, when the available capacity of the local memory is reduced again after the multi-buffering, the controller 140 may return a size of the local memory that corresponds to the reduced available capacity.

Hereinafter, multi-buffering and repartitioning performed by the controller 140 of the multi-core system 100 of FIG. 1 will be further described with reference to FIGS. 2 and 3.

Figure 2:
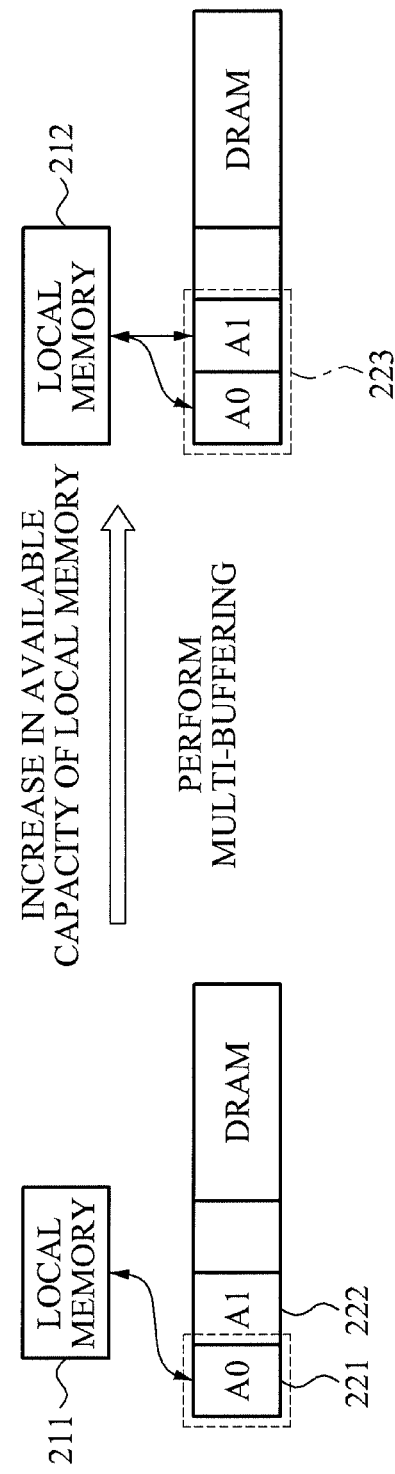
FIG. 2 illustrates a diagram of a multi-buffering operation performed by the multi-core system of FIG. 1.

FIG. 2 illustrates a diagram of a multi-buffering operation performed by the multi-core system 100 of FIG. 1.

Referring to FIG. 2, the multi-core system 100 may process data by allocating subdata A0 221, and subdata A1 222 to a local memory 211. Here, when the local memory 211 is changed to a local memory 212 by an increase in an available capacity of the local memory 211 during a runtime for processing the subdata A0 221, the multi-core system 100 may perform multi-buffering on the data. In other words, since the increase in the available capacity of the local memory 211 leads to a change from the local memory 211 to the larger local memory 212, the multi-core system 100 may upload, to the local memory 212, subdata 223 obtained by combining subdata A0 221 with subdata A1 222.

According to an aspect, when the available capacity of the local memory 211 is reduced again after the change to the local memory 212, the multi-core system 100 may return to a size of the local memory 211 that corresponds to the reduced available capacity.

Figure 3:
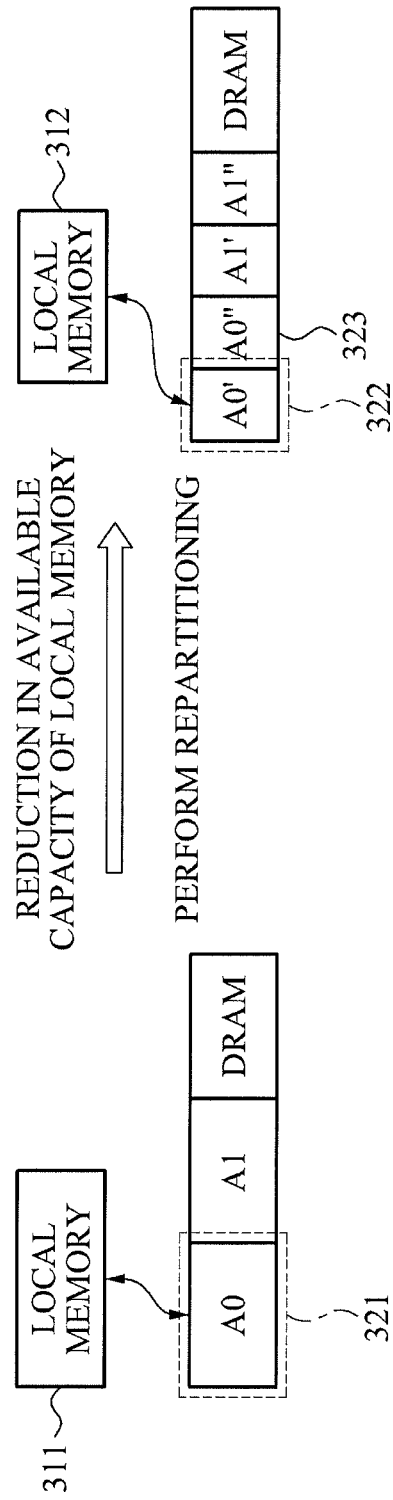
FIG. 3 illustrates a diagram of a repartitioning operation performed by the multi-core system of FIG. 1.

FIG. 3 illustrates a diagram of a repartitioning operation performed by the multi-core system 100 of FIG. 1.

Referring to FIG. 3, the multi-core system 100 may process data by allocating subdata A0 321 to a local memory 311. Here, when the local memory 311 is changed to a local memory 312 by a reduction in an available capacity of the local memory 311 during a runtime for processing the subdata A0 321, the multi-core system 100 may perform repartitioning on the data. Since the reduction in the available capacity of the local memory 311 leads to a change from the local memory 311 to the smaller local memory 312, the multi-core system 100 may repartition the subdata A0 321 into subdata A0' 322 and subdata A0" 323, and may upload the subdata A0' 322 to the local memory 312.

Figure 4:
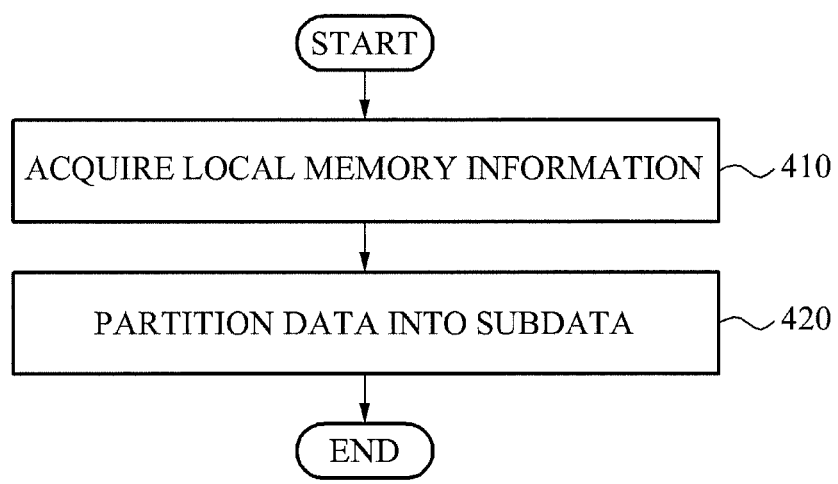
Figure 5:
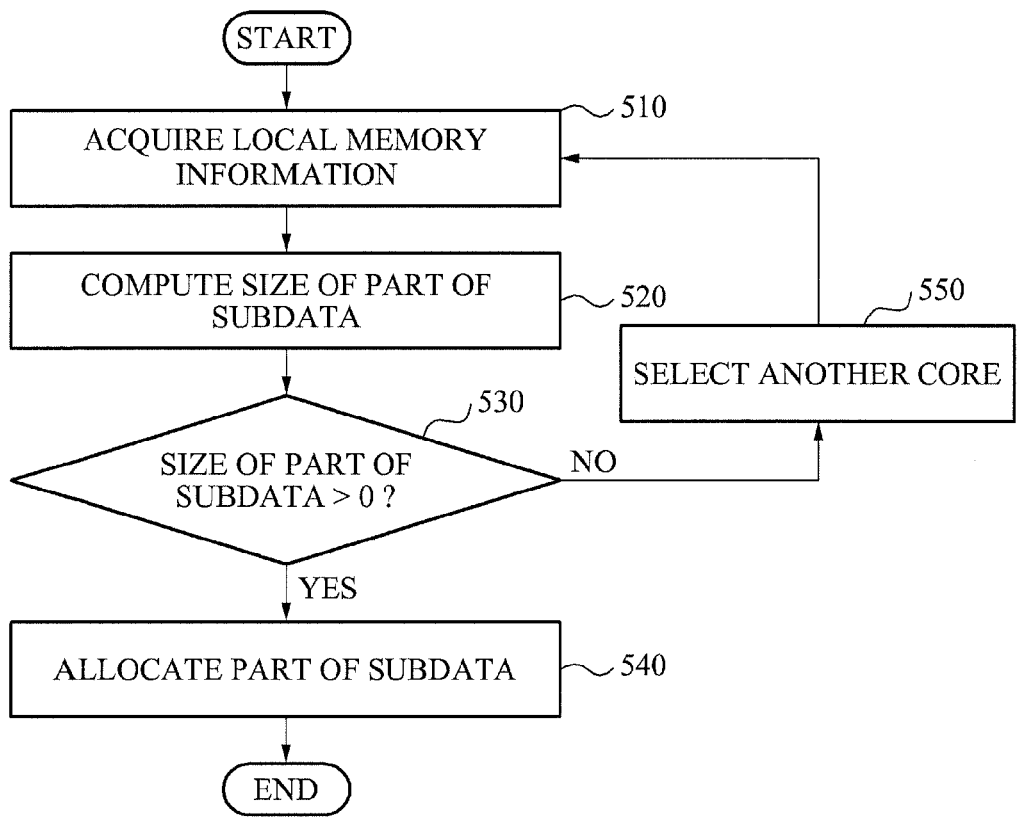

FIGS. 4 through 6 illustrate flowcharts of methods for processing data in parallel in a multi-core system according to example embodiments.

Referring to FIG. 4, in operation 410, local memory information regarding a plurality of local memories may be acquired. Here, the plurality of local memories may respectively correspond to a plurality of cores.

The local memory information may include, for example, information regarding a total size, a currently used size, an available size, a frequency of use, an access cost, and the like, with respect to each of the plurality of local memories.

In operation 420, the data may be partitioned into a plurality of pieces of subdata based on the acquired local memory information.

More specifically, a partition ratio of the plurality of pieces of subdata may be determined based on the local memory information, and the data may be partitioned into the plurality of pieces of subdata based on the determined partition ratio.

According to an aspect, the data may be partitioned into a plurality of pieces of subdata based on a ratio of sizes of the plurality of local memories. For example, when a ratio of sizes of four local memories is set to "3:1:2:1", data may be partitioned into four pieces of subdata at a size ratio of "3:1:2:1."

Depending on example embodiments, data may be partitioned into a plurality of sets of subdata, based on the local memory information. Here, each of the plurality of sets may include at least one piece of subdata.

Referring to FIG. 5, in operation 510, local memory information regarding a local memory corresponding to a subdata processing core among a plurality of cores may be acquired. Here, the subdata processing core may be used to process subdata of the data.

In operation 520, a size of a part of subdata to be allocated to the subdata processing core may be computed based on the acquired local memory information.

In operation 530, whether the computed size of the part of the subdata is greater than "0" may be determined.

When the computed size is greater than "0", the part of the subdata may be allocated to the subdata processing core in operation 540.

When the computed size is equal to or less than "0", another core may be selected from among cores other than the subdata processing core in operation 550, so that the selected core may process subdata.

Referring to FIG. 6, in operation 610, local memory information regarding a local memory corresponding to a core may be acquired during a runtime for processing data in parallel.

In operation 620, whether an available capacity of at least one local memory among the plurality of local memories is changed during the runtime may be determined based on the acquired local memory information.

Specifically, when the available capacity of the at least one local memory is increased, multi-buffering may be performed on the data in operation 631. In operation 640, subdata on which the multi-buffering has been performed may be allocated.

According to an aspect, when the available capacity of the at least one local memory is reduced again after the multi-buffering, a size of the at least one local memory corresponding to the reduced available capacity may be restored.

When the available capacity of the at least one local memory is reduced, repartitioning may be performed on the data in operation 632. In operation 640, subdata where the repartitioning is performed may be allocated.

The above-described example embodiments may be recorded in non-transitory computer-readable media or processor-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The methods for processing data in parallel in a multi-core system may be executed on a general purpose computer or processor or may be executed on a particular machine or processor such as the apparatuses described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method for processing data in parallel in a multi-core system comprising a plurality of cores and a plurality of local memories corresponding to the plurality of cores, the method comprising:
   acquiring local memory information regarding the plurality of local memories;
   partitioning data into a plurality of pieces of subdata based on the acquired local memory information; and
   performing repartitioning on a first subdata among the plurality of pieces of subdata stored in a first local memory among the plurality of local memories when an available capacity of the first local memory is reduced during a runtime for processing the data in parallel.

2. The method of claim 1, wherein the partitioning comprises partitioning the data into the plurality of pieces of subdata based on a ratio of sizes of the plurality of local memories.

3. A method for processing data in parallel in a multi-core system, the method comprising:
   acquiring local memory information regarding a local memory, the local memory corresponding to a core used to process subdata of the data among a plurality of cores;
   computing a size of a part of the subdata, based on the acquired local memory information;
   allocating the part of the subdata to the core used to process the subdata;
   dividing the part of the subdata into a first repartitioned part of the part of the subdata and a second repartitioned part of the part of the subdata when available capacity of the local memory is reduced; and
   wherein the first repartitioned part is stored in the local memory and the second repartitioned part is not stored in the local memory.

4. The method of claim 3, further comprising:
   processing the subdata with a core among the plurality of cores, wherein the core is other than the core used to process the subdata when the computed size is equal to or less than "0".

5. A method for processing data in parallel in a multi-core system comprising a plurality of cores and a plurality of local memories corresponding to the plurality of cores, the method comprising:
   acquiring local memory information regarding a local memory of the plurality of local memories during a runtime for processing the data in parallel, the local memory corresponding to a core of the plurality of cores;
   performing multi-buffering on a first subdata of the data stored in a first local memory among the plurality of local memories when an available capacity of the first local memory is increased; and
   performing repartitioning on the first subdata of the data when the available capacity of the first memory is reduced.

6. The method of claim 5, further comprising:
restoring a size of the local memory when the available capacity is reduced again after the multi-buffering, the size of the local memory corresponding to the reduced available capacity.

7. A non-transitory computer readable recording medium storing a program to cause a computer to implement the method of claim 1.

8. A multi-core system for processing data in parallel, the multi-core system comprising:
a plurality of local memories;
a plurality of cores respectively comprising each of the plurality of local memories; and
a controller to control the plurality of cores to process the data in parallel,
wherein the controller acquires local memory information regarding the plurality of local memories, and partitions the data into a plurality of pieces of subdata, based on the acquired local memory information, and repartitions a first subdata of the data when an available capacity of a first memory is reduced.

9. A multi-core system for processing data in parallel, the multi-core system comprising:
a plurality of local memories;
a plurality of cores respectively comprising each of the plurality of local memories; and
a controller to control the plurality of cores to process the data in parallel,
wherein the controller acquires local memory information regarding a local memory corresponding to a core used to process subdata of the data among the plurality of cores, computes a size of a part of the subdata based on the acquired local memory information, allocates the part of the subdata to the core used to process the subdata, divides the part of the subdata into a first repartitioned part of the part of the subdata and a second repartitioned part of the part of the subdata when available capacity of the local memory is reduced, and the first repartitioned part is stored in the local memory and the second repartitioned part is not stored in the local memory.

10. A multi-core system for processing data in parallel, the multi-core system comprising:
a plurality of local memories;
a plurality of cores respectively comprising the plurality of local memories; and
a controller to control the plurality of cores to process the data in parallel,
wherein the controller acquires local memory information regarding the plurality of local memories during a runtime for processing the data in parallel, performs multi-buffering on a first subdata of the data stored in a first local memory among the plurality of local memories when an available capacity of the first local memory among the plurality of local memories is increased, and performs repartitioning on the first subdata of the data when the available capacity of the first memory is reduced.

11. The method of claim 1, further comprising:
determining a partition ratio of a plurality of pieces of subdata based on a ratio of sizes of the plurality of local memories; and
partitioning the data into the plurality of pieces of subdata based on the determined partition ratio.

12. A method for processing data in parallel in a multi-core system comprising a plurality of cores and a plurality of corresponding local memories, the method comprising:
acquiring local memory information regarding the plurality of local memories;
computing a size of subdata to be allocated to a core of the plurality of cores based on the local memory information; and
recomputing a size of a first subdata of the data stored in a first local memory among the plurality of corresponding local memories when the available capacity of the first local memory is reduced.

* * * * *